US006068489A

United States Patent [19]

Nagata et al.

[11] Patent Number: 6,068,489

[45] Date of Patent: *May 30, 2000

[54] KARAOKE AMPLIFIER WITH VARIABLY SETTABLE RANGE OF PARAMETER TO CONTROL AUDIO SIGNAL

[75] Inventors: Yuichi Nagata; Masao Yoshida; Satoshi Suzuki, all of Hamamatsu, Japan

[73] Assignee: Yamaha Corporation, Hamamatsu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/734,205

[22] Filed: Oct. 21, 1996

[30] Foreign Application Priority Data

Oct. 23, 1995 [JP] Japan .................................... 7-274097

[51] Int. Cl.[7] .............................. G09B 5/00; G10H 1/10; G10H 1/36

[52] U.S. Cl. ................................ 434/307 A; 434/307 R; 434/308; 84/610; 84/631; 381/63

[58] Field of Search ................................ 434/307 R–309, 434/318, 365; 84/477 R, 609–613, 630–637, 644, 650–652, 662; 360/19.1, 33.1, 77.01; 369/32, 47, 48, 50, 58; 381/61–65, 150; 348/678, 484, 571, 595, 738; 345/302, 327, 337, 473

[56] References Cited

U.S. PATENT DOCUMENTS

| | | | |
|---|---|---|---|
| 5,557,056 | 9/1996 | Hong et al. | 434/307 A X |
| 5,567,162 | 10/1996 | Park | 434/307 A |
| 5,663,516 | 9/1997 | Kawashima | 84/610 |
| 5,719,346 | 2/1998 | Yoshida et al. | 84/631 |
| 5,732,142 | 3/1998 | Nagata et al. | 381/63 |
| 5,739,452 | 4/1998 | Nagata | 84/610 |
| 5,741,992 | 4/1998 | Nagata | 84/631 |
| 5,753,845 | 5/1998 | Nagata et al. | 434/307 A X |
| 5,773,744 | 6/1998 | Nagata | 84/610 |

FOREIGN PATENT DOCUMENTS

| | | |
|---|---|---|
| 2-183660 | 7/1990 | Japan . |
| 5-064191 | 3/1993 | Japan . |
| 5-243875 | 9/1993 | Japan . |
| 6-110482 | 4/1994 | Japan . |

*Primary Examiner*—Joe H. Cheng
*Attorney, Agent, or Firm*—Pillsbury Madison & Sutro LLP

[57] ABSTRACT

A karaoke amplifier is constructed for amplifying an audio signal to sound a karaoke performance while processing the audio signal according to a value of a control parameter to acoustically control the karaoke performance. An analog operating member is manually operable to set an initial analog value of the control parameter. An analog/digital converter converts the initial analog value into a corresponding initial digital value. A receiver receives correction data from an external data source. A memory memorizes the received correction data. A calculator arithmetically treats the initial digital value according to the correction data retrieved from the memory to calculate a corrected value of the control parameter. A signal processor processes the audio signal according to the corrected value of the control parameter and amplifies the processed audio signal to sound the karaoke performance which is acoustically modified according to the corrected value of the control parameter.

6 Claims, 2 Drawing Sheets

KARAOKE AMPLIFIER WITH VARIABLY SETTABLE RANGE OF PARAMETER TO CONTROL AUDIO SIGNAL

BACKGROUND OF THE INVENTION

The present invention relates to a karaoke amplifier suitable for a karaoke machine.

In the field of the karaoke machine, a karaoke amplifier is used to adjust parameters of microphone inputs, volume of music sounds and various sound effects according to setup positions of analog operation keys. Generally, in the karaoke amplifier, voltage values (analog amounts) corresponding to the setup positions of the analog operation keys are converted into digital values by an A/D (analog/digital) converter. According to the digital values, the karaoke amplifier adjusts a volume and a tone of vocal sounds and instrumental accompaniment sounds of a karaoke performance, and further controls various acoustic effects of the sounds such as an echo level.

However, since characteristics of volumes, tones, and sound effects delicately vary dependently on a sound field condition of a room in which the karaoke amplifier is installed. Further, the acoustic characteristics of the karaoke sounds depend on performance of loudspeakers and so forth. Thus, an initial operation range of the analog operation keys that has been fixed before factory shipment may not be an optimal range of the control parameters.

Moreover, after the karaoke amplifier was delivered to a user, if specifications thereof are changed, it is necessary to change the initial operation range of the analog operation keys. Unless otherwise, the relation between the operation range of the analog operation keys and a required adjustment range of the parameters may not match with each other.

In addition, in the field of a communication type karaoke machine, there are needs to adjust various parameters of the karaoke amplifier according to musical sound control information contained in MIDI (Musical Instrument Digital Interface) data supplied from a host computer by telecommunication.

However, in the conventional karaoke amplifier, there is no means to adjust the parameters other than operating the analog operation keys. Thus, the conventional karaoke amplifier cannot deal with the above-described situation and requirement.

SUMMARY OF THE INVENTION

The present invention is made from the above-described point of view. An object of the present invention is to provide a karaoke amplifier that can easily change the relation between the nominal or default operation range of the analog operation keys and the actual adjustment range of the control parameters.

According to the invention, a karaoke amplifier is constructed for amplifying an audio signal to sound a karaoke performance while processing the audio signal according to a value of a control parameter to acoustically control the karaoke performance. The karaoke amplifier comprises an analog operating member manually operable to set an initial analog value of the control parameter, an analog/digital converter for converting the initial analog value into a corresponding initial digital value, receiver means for receiving correction data from an external data source, memory means for memorizing the received correction data, calculating means for arithmetically treating the initial digital value according to the correction data retrieved from the memory means to calculate a corrected value of the control parameter, a signal processor for processing the audio signal according to the corrected value of the control parameter, and output means for amplifying the processed audio signal to sound the karaoke performance which is acoustically modified according to the corrected value of the control parameter. More specifically, the analog operating member has a predetermined operation range such that the initial analog value is manually set only within the predetermined operation range. The receiver means receives the correction data which is used to change the predetermined operation range. The calculating means calculates the corrected value according to the correction data such that the corrected value can be altered from the initial value beyond the predetermined operation range. In one form, the receiver means receives the correction data in the form of an offset value, and the calculating means arithmetically adds the offset value to the initial digital value to calculate the corrected value such that the predetermined operation range can be shifted by the offset value. In another form, the receiver means receives the correction data in the form of a multiplier value, and the calculating means arithmetically multiplies the initial digital value by the multiplier value to calculate the corrected value such that the predetermined operation range can be dynamically expanded by the multiplier value.

DETAILED DESCRIPTION OF THE INVENTION

Figure 1:
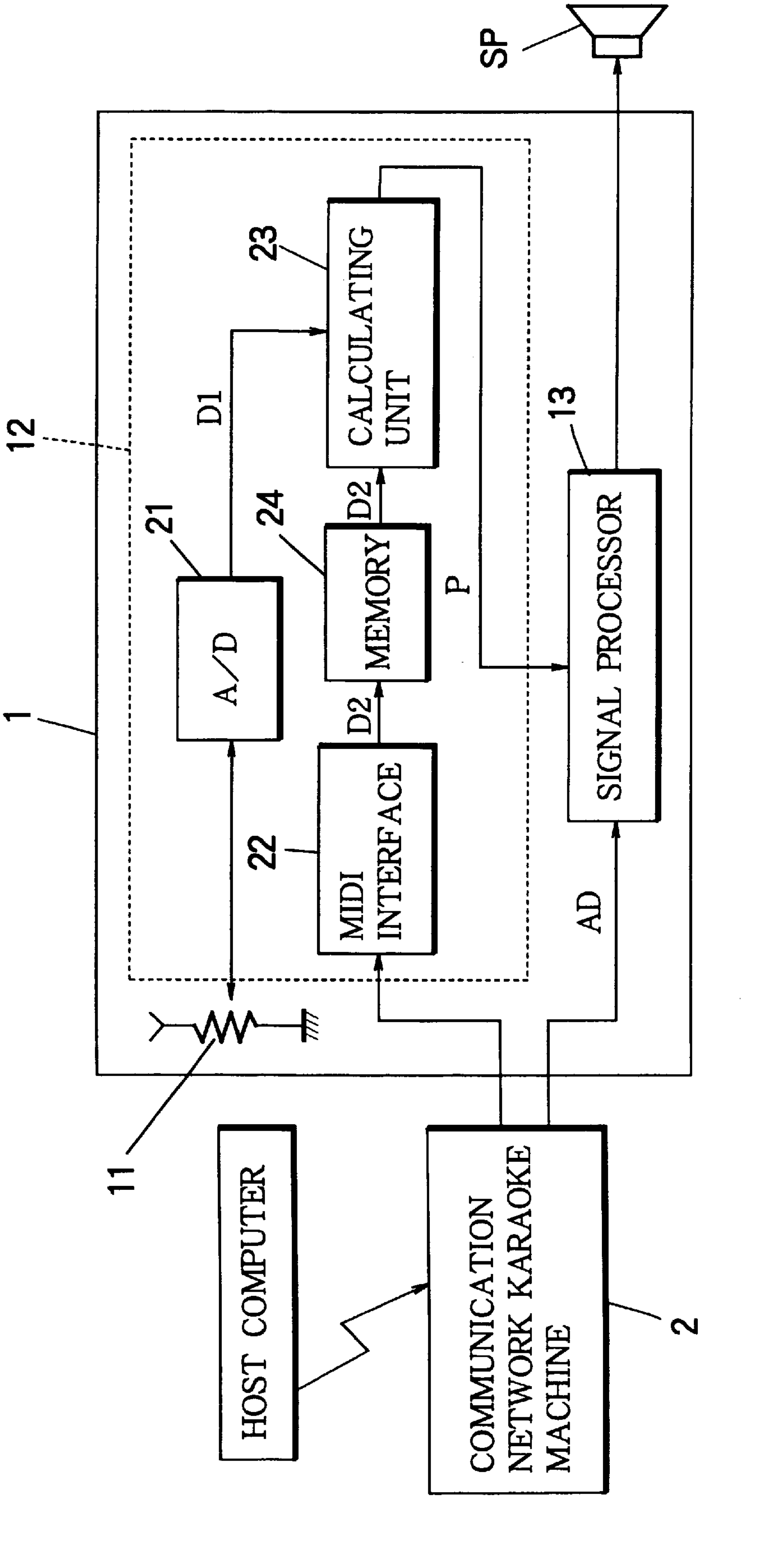
FIG. 1 is a block diagram showing a structure of an embodiment of the present invention.

With reference to the accompanying drawings, an embodiment of the present invention will be described. FIG. 1 is a block diagram showing an embodiment of the present invention. In the embodiment, the present invention is applied for a karaoke amplifier for use with a communication network karaoke machine which is a karaoke terminal connected to a host computer station through a communication network.

In FIG. 1, reference numeral 1 denotes a karaoke amplifier according to the present invention. The karaoke amplifier 1 comprises an analog operating member in the form of an analog operation key 11, a microcomputer 12, and a signal processor 13. The analog operation key 11 is slidably operated by a user of the karaoke amplifier 1. A voltage signal is outputted from the key 1, which represents an initial or nominal analog value corresponding to a set position of the analog operation key 1. In reality, a plurality of analog operation keys may be disposed corresponding to various parameters for adjusting an audio signal representative of a karaoke performance. However, in FIG. 1, for simplicity, one analog operation key 11 is depicted.

The microcomputer 12 comprises an A/D (analog/digital) converter 21, a MIDI interface 22, a calculating unit or calculator 23, and a memory 24. The A/D converter 21 converts the analog value of the voltage signal that is outputted from the analog operation key 1 into a corresponding digital value. A digital signal representative of the digital value D1 corresponding to the set position of the analog operation key 1 is fed to the calculating unit 23 from the A/D converter 21. The MIDI interface 22 receives MIDI data from an external communication network karaoke machine 2. An offset value D2 contained in the MIDI data is stored in the memory 24 as correction data. The offset value D2 is written in, for example, a region of an exclusive message of a system message of the MIDI data format. The calculating unit 23 adds the digital value D1 supplied from the A/D converter 21 and the offset value D2 stored in the memory 24 with each other. The result of the addition (D1+D2) is supplied as a parameter control value P to the signal processor 13.

The signal processor 13 is composed of, for example, an electronic volume and a DSP (Digital Signal Processor) or the like. The signal processor 13 adjusts or modifies an audio signal AD supplied from the communication network karaoke machine 2 according to the parameter control value P set by the calculating unit 23, and outputs the resultant signal to a speaker SP. The audio signal AD that is inputted to the signal processor 13 represents a karaoke performance containing a vocal sound that is inputted from a microphone, an effect sound such as an echo or a chorus added to a vocal sound, and a karaoke music sic sound of melody and accompaniment generated by a sound source circuit provided in the communication network karaoke machine 2 according to the MIDI data.

Parameters for adjusting the audio signal AD are used for controlling a microphone level (namely, a volume level of the vocal sound), an echo level (namely, a level of the echo sound added to the vocal sound), a microphone delay (a delay time of the echo sound relative to the vocal sound), a microphone reverberation time (namely, a duration of the reverberation sound added to the vocal sound), a microphone tone quality (namely, frequency characteristics of the vocal sound divided in three frequency ranges of a low sound range, a middle sound range, and a high sound range), a music level (namely, a volume level of the karaoke music sound), a music echo level (namely, a level of the echo sound added to the karaoke music sound), a music tone quality (namely, frequency characteristics of the karaoke music sound which is divided into two frequency ranges of low sound range and a high sound range), and a harmonic balance (namely, a balance between the vocal sound and the chorus sound added thereto).

Next, the operation of the inventive karaoke amplifier will be described. When the karaoke amplifier 1 is turned on, the digital value D1 corresponding to the set state of the analog operation key 11 is supplied as the initial or nominal value of the control parameter directly to the signal processor 13 without any correction.

While instrumental accompaniments of the karaoke performance are being performed, when the analog operation key 11 is operated, an updated digital value D1 corresponding to a new set position of the key 11 is supplied as an updated parameter control value P to the signal processor 13. Thus, the audio signal AD is adjusted or controlled according to the value P of the control parameter to modify the sound of the karaoke performance.

When the offset value D2 contained in the MIDI data is supplied from the communication network karaoke machine 2, the offset value D2 is stored in the memory 24. The digital value D1 corresponding to the current set position of the analog operation key 11 and the offset value D2 retrieved from the memory 2 are added to each other. The result of the addition D1+D2 is supplied as a corrected parameter control value P to the signal processor 13. Thus, the signal processor 13 processes and adjusts the audio signal AD according to the effective control parameter value (D1+D2) which is corrected by the offset value D2, in place of the nominal digital value D1 corresponding to the set position of the analog operation key 11.

Thereafter, unless a new offset value D2 is supplied from the communication network karaoke machine 2, the current offset value D2 stored in the memory 24 is always added to the digital value D1 corresponding to the set position of the analog operation key 11. The added value is supplied as the parameter control value P to the signal processor 13.

Figure 2:
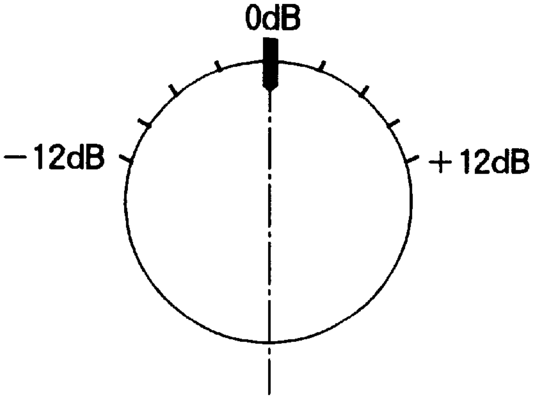
FIGS. 2(*a*) and 2(*b*) are schematic diagrams for explaining operation and effect of the embodiment, FIG. 2(*a*) showing an initial setup state, and FIG. 2(*b*) showing another state after adjustment is performed with an offset value.
Figure 2:
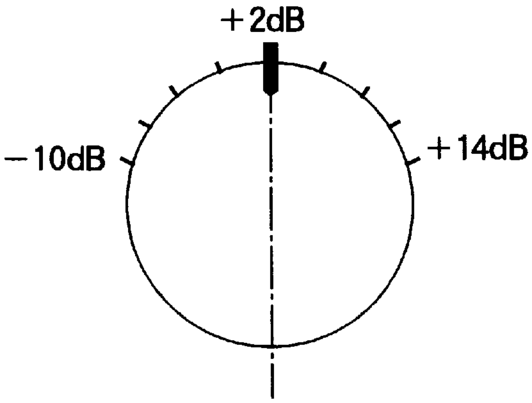

Thus, according to the above-described embodiment, an actual value range of the control parameter of the audio signal AD can be corrected or adjusted according to the correct data in matching with sound field condition of a play room in which the karaoke amplifier 1 is installed. Further, the effective range of the control parameter may be adjusted to match with acoustic characteristics of the speaker SP. For example, as shown in FIG. 2(*a*), assuming a center position of the analog operation key 11 for adjusting the volume corresponds to a value 0 dB within a predetermined operation range, the minimum position corresponds to a value −12 dB and the maximum position corresponds to a value +12 dB. When the offset value D2 is given, for example, +2 dB as shown in FIG. 2(*b*), the center position corresponds to +2 dB, the minimum position corresponds to −10 dB, and the maximum position corresponds to +14 dB. Namely, the predetermined operation range of −12 dB through +12 dB is shifted to the effective operation range of −10 dB through +14 dB to adapt the amplifier for the condition of the play room.

When the relation between the nominal operation range of the analog operation key 11 and the actual value range of the parameter should be changed due to version-up or modification of the specification of the karaoke machine products, the relation can be readily adjusted with a proper offset value D2. When the offset value D2 is supplied along with music data such as the MIDI data, the adjustable value range of the control parameter of the audio signal can be properly shifted in matching with the karaoke music.

The present invention is not limited to the above-described embodiment. Instead, the following modifications of the present invention are available.

(1) As one modification of the above-described embodiment, a coefficient value or multiplier value D2' may be supplied as the correction data instead of the offset value D2. In such a case, the calculation unit 23 multiplies the coefficient value D2' by the digital value D1 corresponding to the set position of the analog operation key 11. The result of the multiplication (D1×D2') is supplied as the parameter control value P to the signal processor 13. In this structure, the dynamic range of the parameter for the analog operation key 11 can be expanded according to the coefficient value D2'.

(2) When the digital value D1 corresponding to the set position of the analog operation key 11 is to be corrected, various calculation algorithm may be used instead of the simple addition or the multiplication. For example, the combination of the addition of the offset value D2 in the above-described embodiment and the multiplication of the coefficient value D2' of the above-described modification may be effected to correct the digital value D1.

(3) In the above-described embodiment, the present invention is applied to the karaoke amplifier 1 for use with the communication network karaoke machine. However, the present invention can be applied to a karaoke amplifier used for other than the communication network karaoke machine.

For summary, the inventive karaoke amplifier 1 is constructed for amplifying an audio signal AD to sound a karaoke performance while processing the audio signal AD according to a value P of a control parameter to acoustically control the karaoke performance. In the karaoke amplifier 1, the analog operating member 11 is manually operable to set an initial analog value of the control parameter. The analog/digital converter 21 converts the initial analog value into a corresponding initial digital value D1. The receiver means in the form of the MIDI interface 22 receives correction data D2 from an external data source in the form of the karaoke machine 2. The memory 24 memorizes the received correction data D2. The calculating unit 23 arithmetically treats the initial digital value D1 according to the correction data D2 retrieved from the memory 24 to calculate a corrected value P of the control parameter. The signal processor 13 processes the audio signal AD according to the corrected value P of the control parameter. The signal processor 13 further amplifies the processed audio signal AD to sound the karaoke performance which is acoustically modified according to the corrected value P of the control parameter. Specifically, the analog operating member 11 has a predetermined operation range such that the initial analog value is manually set only within the predetermined operation range. The receiver 22 receives the correction data D2 which is used to change the predetermined operation range. The calculating unit 23 calculates the corrected value P according to the correction data D2 such that the corrected value P can be altered from the initial value D1 beyond the predetermined operation range. More specifically, the receiver 22 receives the correction data D2 in the form of an offset value. The calculating unit 23 arithmetically adds the offset value D2 to the initial digital value D1 to calculate the corrected value P such that the predetermined operation range can be shifted by the offset value D2. Otherwise, the receiver 22 receives the correction data D2 in the form of a multiplier value. The calculating unit 23 arithmetically multiplies the initial digital value D1 by the multiplier value D2 to calculate the corrected value P such that the predetermined operation range can be dynamically expanded by the multiplier value. In one form, the receiver composed of the MIDI interface 22 receives the correction data D2 contained in MIDI data which is provided from the external data source 2 to create the karaoke performance such that the predetermined operation range can be altered in matching with the karaoke performance. Preferably, the signal processor 13 processes the audio signal AD according to the control parameter so as to control at least one of a sound volume, a tone quality and an acoustic effect of the karaoke performance.

As described above, according to the present invention, various parameters of an audio signal can be corrected in matching with karaoke play environments such as sound field condition of a play room in which the karaoke amplifier is installed, and frequency response of the speaker. In addition, according to the present invention, the karaoke amplifier can easily deal with specification change of the karaoke machine product. Moreover, when the music data and the correction data are supplied in the form of the MIDI data, the parameters of the audio signal can be properly adjusted according to the correction data contained in the MIDI data in matching with the karaoke music which is created according to the music data contained in the same MIDI data. In particular, according to the present invention, the manual operation range of the analog operation key and the adjustable value range of the parameter can be shifted relative to each other. Moreover, according to the present invention, the dynamic range of the parameter corresponding to the analog operation key can be changed according to the correction data.

What is claimed is:

1. A karaoke amplifier for amplifying an audio signal to sound a karaoke performance according to music data while processing the audio signal according to a value of a control parameter to acoustically control the karaoke performance, the karaoke amplifier comprising:

an analog operating member manually operable to set an initial analog value of the control parameter;

an analog/digital converter for converting the initial analog value into a corresponding initial digital value;

receiver means for receiving correction data contained in the music data from an external data source;

memory means for memorizing the received correction data;

calculating means for arithmetically treating the initial digital value according to the correction data retrieved from the memory means to calculate a corrected value of the control parameter;

a signal processor for processing the audio signal according to the corrected value of the control parameter; and output means for amplifying the processed audio signal to sound the karaoke performance which is acoustically modified according to the corrected value of the control parameter.

2. A karaoke amplifier according to claim 1, wherein the analog operating member has a predetermined operation range such that the initial analog value is manually set only within the predetermined operation range, the receiver means receives the correction data which is used to change the predetermined operation range, and the calculating means calculates the corrected value according to the correction data such that the corrected value can be altered from the initial value beyond the predetermined operation range.

3. A karaoke amplifier according to claim 2, wherein the receiver means receives the correction data in the form of an offset value, and the calculating means arithmetically adds the offset value to the initial digital value to calculate the corrected value such that the predetermined operation range can be shifted by the offset value.

4. A karaoke amplifier according to claim 2, wherein the receiver means receives the correction data in the form of a multiplier value, and the calculating means arithmetically multiplies the initial digital value by the multiplier value to calculate the corrected value such that the predetermined operation range can be dynamically expanded by the multiplier value.

5. A karaoke amplifier according to claim 2, wherein the receiver means receives the correction data contained in the music data formed of MIDI data which is provided from the external data source to create the karaoke performance such that the predetermined operation range can be altered in matching with the karaoke performance.

6. A karaoke amplifier according to claim 1, wherein the signal processor processes the audio signal according to the control parameter so as to control at least one of a sound volume, a tone quality and an acoustic effect of the karaoke performance.

* * * * *